US007373960B1

(12) United States Patent
Westbrook et al.

(10) Patent No.: US 7,373,960 B1
(45) Date of Patent: May 20, 2008

(54) BRUSH CUTTER

(76) Inventors: Mark Kevin Westbrook, 2627 Meadow La., Benton, AR (US) 72015; Mickey Wayne Simpson, P.O. Box 550, Benton, AR (US) 72015

( * ) Notice: Subject to any disclaimer, the term of this patent is extended or adjusted under 35 U.S.C. 154(b) by 0 days.

(21) Appl. No.: 11/314,384

(22) Filed: Dec. 21, 2005

Related U.S. Application Data

(60) Provisional application No. 60/729,578, filed on Oct. 24, 2005.

(51) Int. Cl.
*A01G 23/08* (2006.01)

(52) U.S. Cl. .................. 144/34.1; 144/4.1; 144/24.13; 144/208.3; 144/208.8

(58) Field of Classification Search ............ 144/162.1, 144/218, 4.1, 370, 176, 34.1, 24.13, 181, 144/208.3, 208.8, 242.1, 245.3, 377; 56/16.4 R, 56/16.4 A–16; 241/92, 93, 101.77, 101.76
See application file for complete search history.

(56) References Cited

U.S. PATENT DOCUMENTS

| 263,044 | A | * | 8/1882 | Holston ........................ 144/181 |
| 2,779,363 | A | * | 1/1957 | Laughton ................... 144/208.1 |
| 3,343,575 | A | | 9/1967 | Trout ............................ 144/34 |
| 3,574,989 | A | | 4/1971 | Rousseau ..................... 56/10.7 |
| 3,955,765 | A | * | 5/1976 | Gaitten ......................... 241/28 |
| 4,063,359 | A | | 12/1977 | Luscombe .................. 30/379.5 |
| 4,109,690 | A | * | 8/1978 | Berg ............................ 144/163 |
| 4,236,554 | A | * | 12/1980 | Nicholson .................. 144/34.1 |
| 4,273,169 | A | | 6/1981 | Baenen ......................... 144/34 |
| 4,304,275 | A | * | 12/1981 | Glover ..................... 144/208.9 |
| 4,683,924 | A | * | 8/1987 | Cornelius ................... 144/4.1 |
| 5,042,727 | A | | 8/1991 | Plante ..................... 241/101.7 |

* cited by examiner

*Primary Examiner*—Bena Miller
(74) *Attorney, Agent, or Firm*—Keisling Pieper & Scott PLC; Trent C. Keisling; David B. Pieper

(57) ABSTRACT

The invention provides a brush cutter and chipper that attaches to the end of an articulating arm or boom on equipment. The cutter may utilize existing hydraulic power and controls. The cutter includes a housing with external feed assembly that feeds material through a gate to an internal cutting assembly. The feed assembly has a tensioned upper roller that may move arcuately and a stationary lower roller. The rollers preferably rotate oppositely and each has peripheral cleats to facilitate feeding. The housing mounts an internal rotating drum that may be rotationally linked with the rollers. The drum has a cutting surface, which may be a peripherally wound toothed chain, that cuts entering materials smaller pieces. The drum rotates against the bottom side of the fed material to insure that the material is cut into small pieces. The small pieces exit through a chute at the bottom of the housing.

2 Claims, 7 Drawing Sheets

BRUSH CUTTER

CROSS-REFERENCE TO RELATED APPLICATIONS

This application claims priority to and is a continuation-in-part of U.S. provisional application Ser. No. 60/729,578, filed Oct. 24, 2005.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a tree and brush cutting attachment adapted to be carried by a mobile vehicle having an articulating boom. More particularly, the invention is a retrofitable attachment adapted to be mounted to a trackhoe or another suitable vehicle to trim right of ways and the like. Known art may be found in U.S. Classes 241 and 144, subclasses 101.7 and 3 as well as in other classes and subclasses.

2. Description of the Known Art

Mobile tree trimming machinery has been known in the art for some time. The earliest devices were essentially exposed rotary saws powered by and mounted upon a railway car. The mobility of these devices was severely restricted and they were often dangerous for workers because of the exposed blades. Several devices have since addressed some deficiencies of these devices to improve upon this early art.

For example, U.S. Pat. No. 3,343,575 to Trout shows a tree and brush rotary saw attachment for the free end of a boom of a backhoe. The saw assembly is mounted on a frame that is maneuverable for sawing at different elevations and angles for sawing brush and trees and for tree trunks and limbs. The saw blade is completely exposed on this device. This device makes no provision for clipping or shredding sawn debris.

U.S. Pat. No. 4,273,169 to Baenen shows a tree harvesting cable saw for severing a standing tree adjacent its base. The apparatus includes a main frame pivotally supported on the end of a boom that is in turn pivoted on a vehicle turn-table. The frame has a pair of tree gripping grapple arms at the upper end for gripping the tree to be cut and the cable saw at the bottom end. The cable saw is an endless cable which runs over pulleys mounted on a pair of movable arms which scissor together the completely sever the tree while it is gripped by the grapple arms. The saw blades in this device are substantially exposed during use. This device is also relatively immobile with respect to agile movement about a tree for cutting limbs only. This is not disadvantageous for the device's intended use of cutting entire trees but would be deleterious for cutting limbs on a tree.

U.S. Pat. No. 4,063,359 to Luscombe discloses a vehicle mounted boom device including a lower boom member pivotally mounted on the vehicle and an upper boom pivotally connected thereto. An elongated chain saw mechanism is mounted on the upper boom for carrying out tree pruning or cutting operations. The saw on this device is also completely exposed. This device is further not adapted to chip or shred sawn debris.

U.S. Pat. No. 3,574,989 to Rousseau discloses a grinder attachable to a tractor. The grinder is designed to rotate about a horizontal axis with cutting knives also provided about horizontal axis. The knives move in a plane perpendicular to their cutting edge and upon obstruction, they may move up to 360 degrees backwards, without any stopping means. This device has substantially exposed cutting knives that are not adapted to chip or shred sawn debris.

U.S. Pat. No. 4,683,924 to Cornelius discloses an apparatus for cutting and chipping trees and brush that includes a housing telescopically received at the end of a hollow rectangular boom or secured onto the existing boom of a vehicle and for cutting tree limbs or brush to be cut and chipped. The housing has a cutting member at the front portion extending outwardly for cutting trees or brush and feeds the cut material into a chipper. The rear of the housing forms a rectangular duct and a pair of alignment guides extend angularly outward from the front portion to receive the trunk of the tree being cut. A pair of cable guides extend between the top of the housing to the front of the alignment guides to divert power lines or cables and prevent them from being cut. The chipper reduces the cut material to chip size for passage through the duct. A blower moves chipped materials rearwardly through the duct portion. A nozzle on the underside of the housing discharges fluid onto the remaining cut materials to seal the cut portion. The cutting member preferably is a cylindrical member with radially-extending cutting blades secured thereon and rotate in the opposite direction of the chipping member. This device has blades that are exposed at one end and does not provide a single cutting and chipping blade. Moreover, this device is not retrofittable to conventional equipment such as trackhoes or the like.

U.S. Pat. No. 5,042,727 to Plante discloses a bushwood chopper with a frame adapted to be mounted on a crane-type vehicle at the end of a boom. The frame has a structure for supporting a rotatable shaft on which is mounted at least one disc supporting on its periphery, two pivoting cutting blades. The shaft has an abutting ring around its periphery at the level of the cutting blades for preventing the latter from freely rotating 360 degrees. The blades can pivot backwardly upon a sudden resistance to a limit allowing them to hide within the periphery of the disc and to return, as promptly as possible, in their radial operating position. The bushwood chopper, preferably, as a plurality of superposed discs and cutting blades. This device sprays chipped debris over a large area including the operators position during use, which obstructs the operator's view of the area undesirably.

The known art fails to provide a system that positively feeds a chipping chamber that may be easily retrofitted to existing mobile machinery. The prior art also fails to provide a cutter and chipper that permits an operator to trim trees from many angles and particularly laterally while depositing chipped debris directly beneath the chipper in a controlled manner. Many of the known art devices operate with substantially exposed cutting devices or scatter debris over a wide area including against the vehicle transporting the chipper, which is unsafe for the operators and others in the vicinity.

The known art also fails to provide a device with a cutter and feed assembly that are linked together. In particular, the known art fails to provide a device with a cutter and feed assembly that is bidirectional in rotation. That is, a device where the cutter and feed assembly may rotate forwardly to feed and cut materials or rotate rearwardly to unfed entering materials to clear jams or the like. This can be particularly convenient if the cutter were overloaded or if using a chain for the cutter that might break and prevent cutting of materials for example.

SUMMARY OF THE INVENTION

The present invention addresses the perceived shortcomings of the known art. The present invention provides a brush cutter and chipper that attaches to the end of an articulated member such as a hydraulic arm or boom, which are commonly found on conventional equipment such as excavators, backhoes, trackhoes, or other similar equipment. The attachment is retrofittable to fit such machinery and adapted to be hydraulically powered to utilize existing motive power and controls for such machinery.

The attachment includes a rigid housing with an external feed assembly on one side that feeds an internal drum cutter through an opening or mouth in the housing. The feed assembly uses a pair of oppositely rotating feed rollers to force materials through the housing mouth. The lower roller is mounted to the housing adjacent the bottom edge of the housing mouth by rigid set-offs. The upper roller is pivotally mounted to the housing adjacent the top edge of the housing mouth by pivoting set-offs. The upper roller is spring tensioned so that is biased proximate the lower roller. The pivotal movement of the upper roller permits it to move in a vertical arc with respect to the lower roller. This pivoting movement permits variably sized limbs and brush to enter the housing.

The housing mounts an internal rotatable drum with a cutting surface. The drum may be powered by hydraulics or other means associated with the mobile machinery upon which the attachment is mounted. Primary consideration is that the drum turn sufficiently to chip brush and limbs with its teeth. The drum is wrapped ideally by a chain saw-like chain or other toothed chain. The cutting chain is wrapped circularly about the drums periphery and secured on both ends. Thus, the chain may be easily removed and replaced or surfaced.

During operation, the rollers rotate oppositely to thereby pull limbs and brush into the housing. Both of the rollers preferably have cleats or dogs on their periphery that catch on the entering material to facilitate feeding by both opening the space between the rollers while also pulling the material into the housing mouth. The rollers are also powered by hydraulics or other means associated with the mobile machinery upon which the attachment is mounted.

In one exemplary embodiment, the rollers use solid cylinders and the hydraulic drive motor for each roller is mounted externally to the roller. In another exemplary embodiment, the rollers use hollow cylinders that permit mounting of the hydraulic drive motors inside the respective rollers.

The entering materials are fed into the housing by the rotating action of the feed rollers, which forces the material inside the housing where it is to be cutup and chipped or shred therein. The drum rotates against the bottom side of the fed material to insure that the material is cut into small pieces or chipped or shred. The material entering the housing may only exit after being thoroughly shredded in the housing. The housing exit discharges the chipped material onto the ground beneath the housing. In this manner, the trajectory of flying debris is controlled such that the debris is directed toward the ground vertically as opposed to horizontally spread. In this fashion, the debris is directed away from the operator and the machinery to prevent detrimental encounters therewith.

In one exemplary embodiment, the cutter and feed assembly are linked together in the same hydraulic circuit. This linking permits the cutter and feed assembly to be bidirectional in rotation. That is, the cutter and feed assembly may rotate forwardly to feed and cut materials or rotate rearwardly to remove entering materials to clear jams or the like. This can be particularly convenient if the cutter were overloaded or if a cutter chain broke that prevented material cutting for example.

Thus, the invention provides a brush cutter and chipper that attaches to the end of an articulating arm or boom on equipment. The cutter may utilize existing hydraulic power and controls. The cutter includes a housing with external feed rollers that feed material through a gate to an internal drum cutter. The upper roller is spring loaded and may move arcuately while the lower roller is stationary. The rollers preferably rotate oppositely and each has peripheral cleats to facilitate feeding. The housing mounts an internal rotating drum that may be rotationally linked with the rollers. The drum has a cutting surface, which may be a peripherally wound toothed chain, that cuts entering materials smaller pieces. The drum rotates against the bottom side of the fed material to insure that the material is cut into small pieces. The small pieces are discharged through an exit proximate the bottom of the housing.

An object of the present invention is to provide an improved cutting and chipping apparatus that may be retrofitted to existing mobile machinery and powered thereby.

Another object of the present invention is to provide an improved apparatus for chipping or shredding brush and limbs.

Yet another object of the present invention is to provide a safe device for cutting tree limbs.

A basic object of the present invention is to provide a device for clearing right of ways.

An object of the present invention is to provide a device that enables an operator to maintain visual clarity of the surrounding area when cutting overhead limbs and brush.

Another object of the present invention is to promote operator safety during tree trimming.

An object of the present invention is to provide a device able to be mounted on various equipment quickly and conveniently.

A basic object of the present invention is to expedite tree trimming.

Another object of the present invention is to provide a device that deposits shredded material in the right of way.

Yet another object of the present invention is to provide a bidirectional cutter that may be rotated backwardly to unload the cutter.

An object of the present invention is to provide a spring-tensioned feed assembly that automatically pivots to accept materials of various sizes for cutting.

Another object of the present invention is to provide hollow drum cylinders for the protective mounting of hydraulic drive motors therein.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
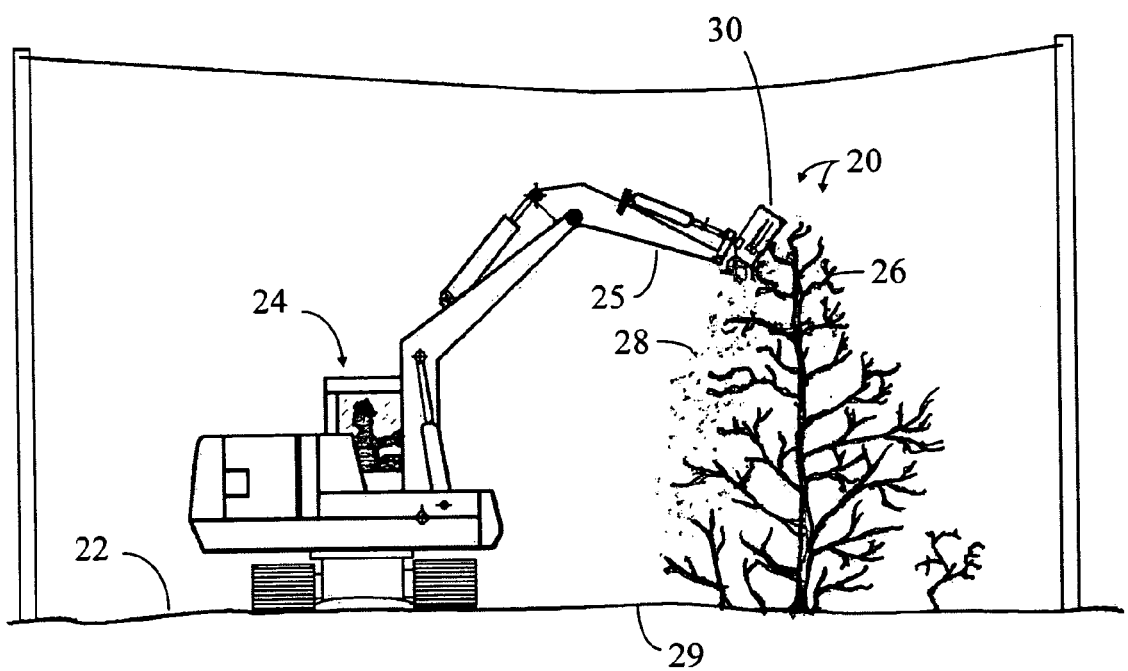
FIG. 1 is an environmental view showing one embodiment of our novel Brush Cutter in accordance with the present invention.
Figure 2:
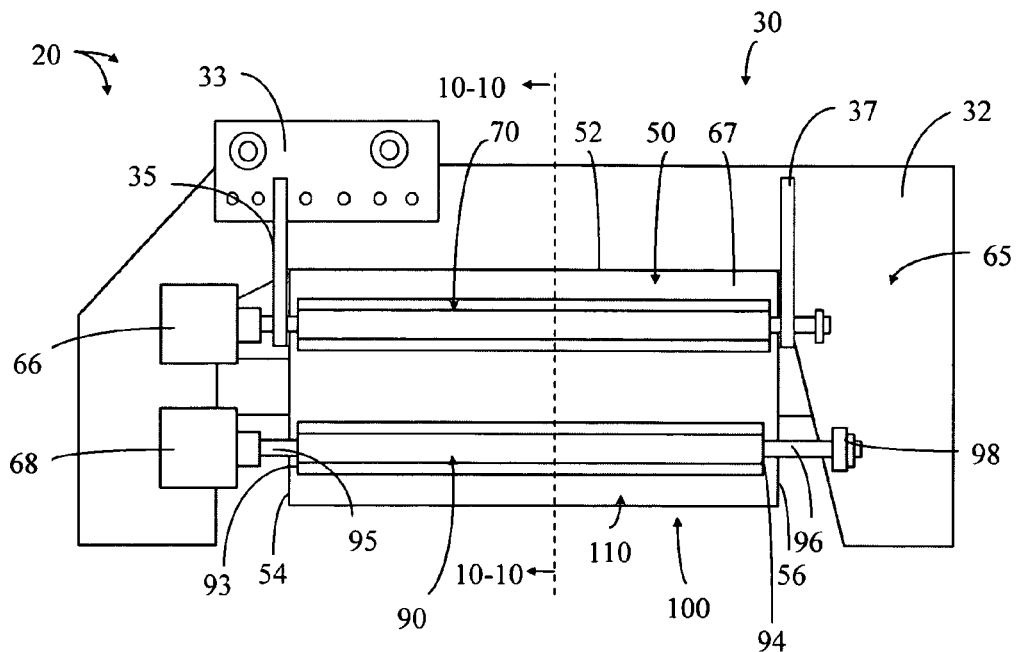
FIG. 2 is a front elevational view thereof.
Figure 3:
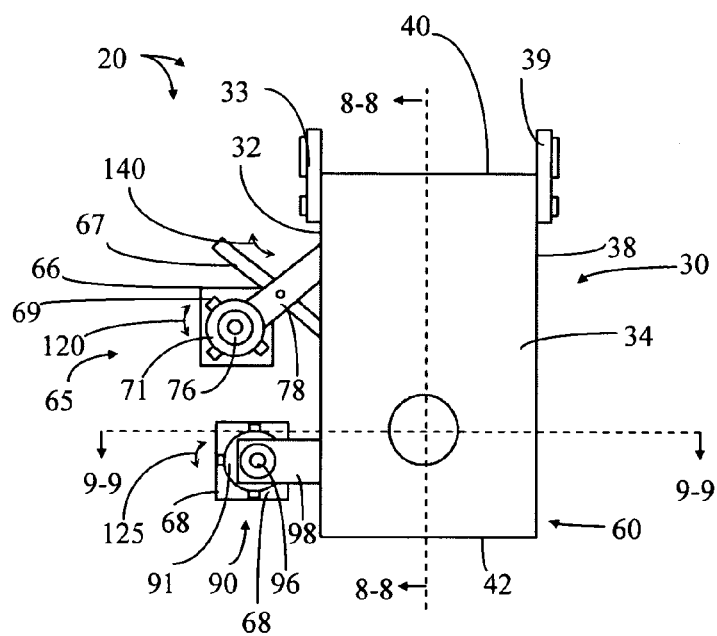
FIG. 3 is a side elevational view thereof taken generally from the right side of FIG. 2.
Figure 4:
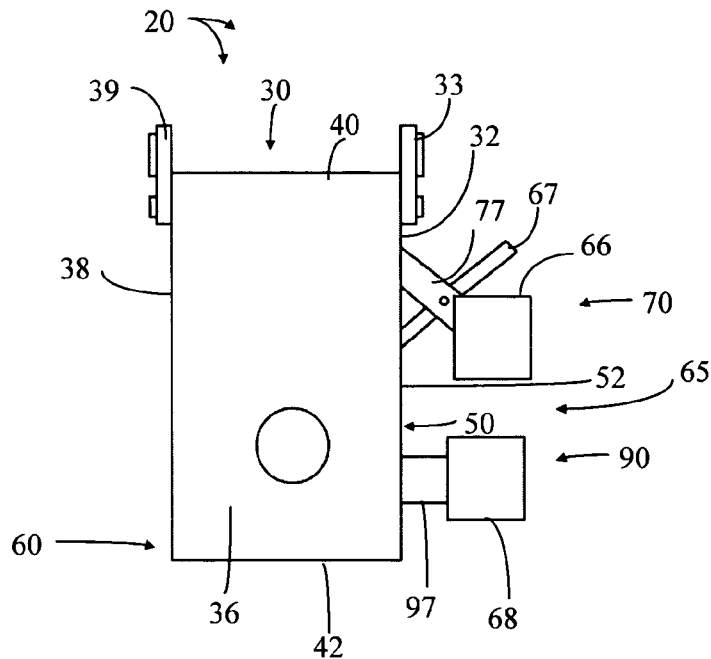
FIG. 4 is a side elevational view thereof taken generally from the left side of FIG. 2.
Figure 5:
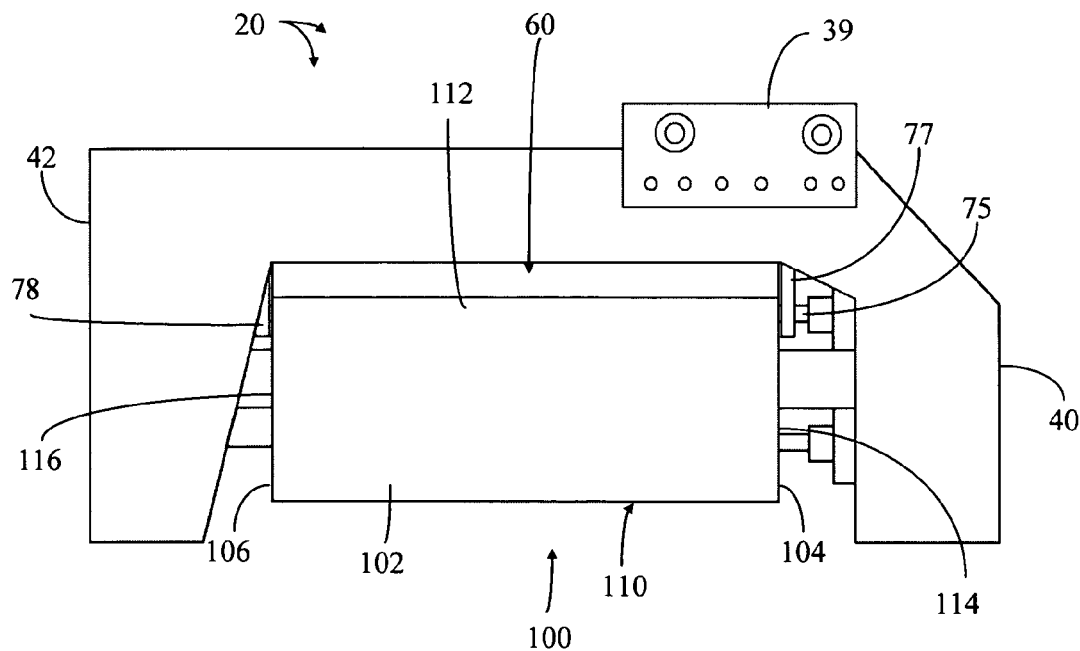
FIG. 5 is a rear elevational view thereof.
Figure 6:
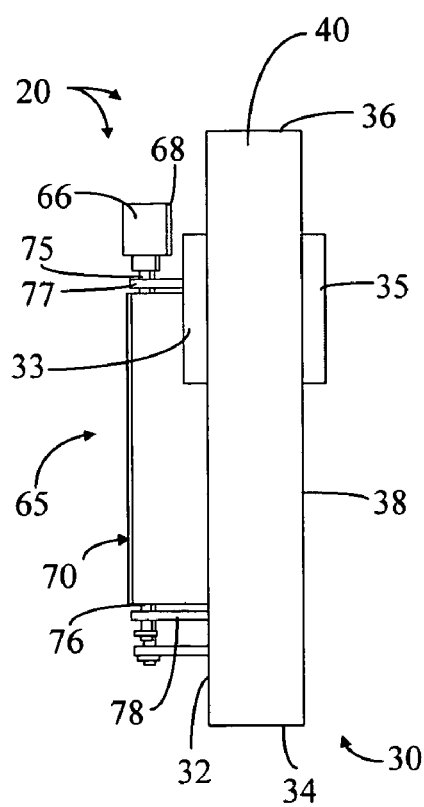
FIG. 6 is a top plan view thereof.
Figure 7:
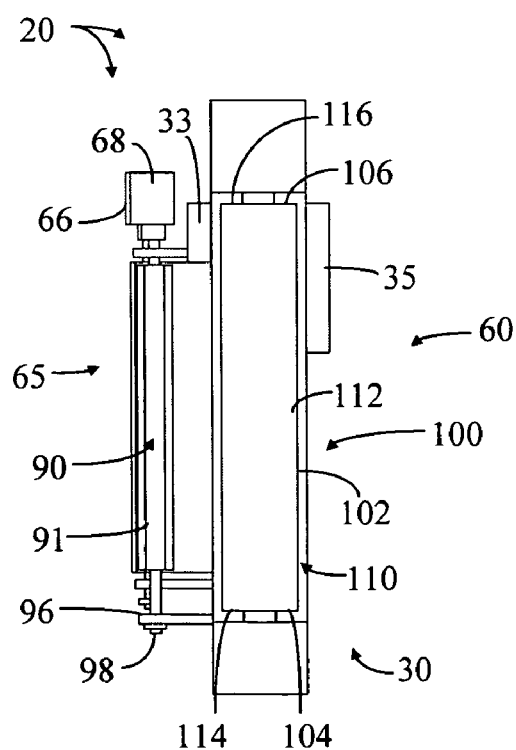
FIG. 7 is a bottom plan view thereof.
Figure 8:
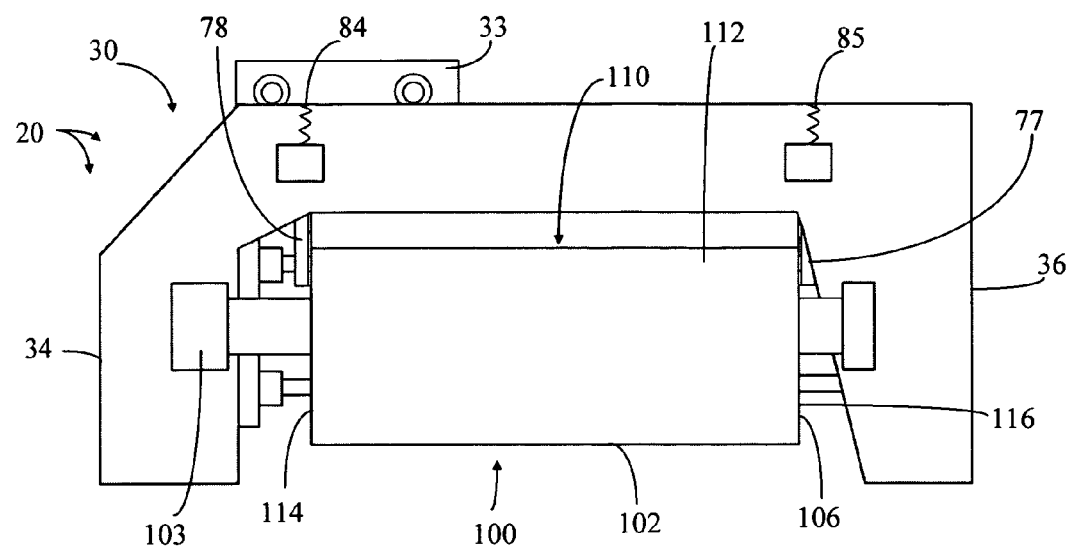
FIG. 8 is a sectional view taken along line 8-8 of FIG. 3.
Figure 9:
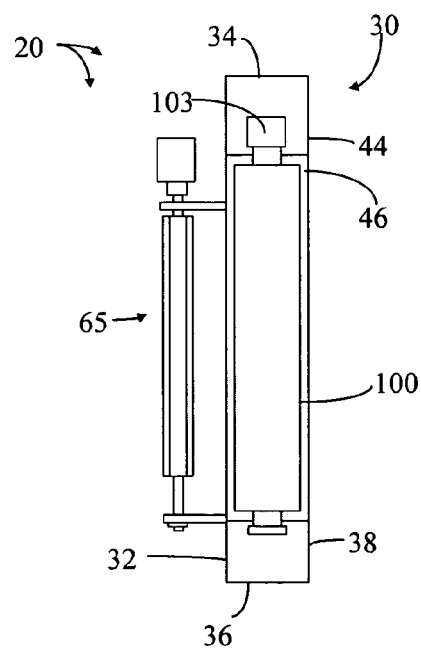
FIG. 9 is a sectional view taken along line 9-9 of FIG. 3.
Figure 10:
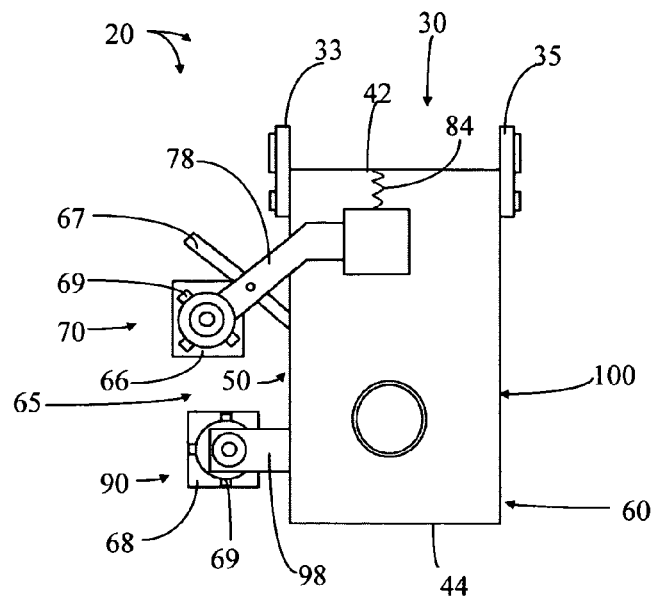
FIG. 10 is a sectional view taken along line 10-10 of FIG. 2.
Figure 11:
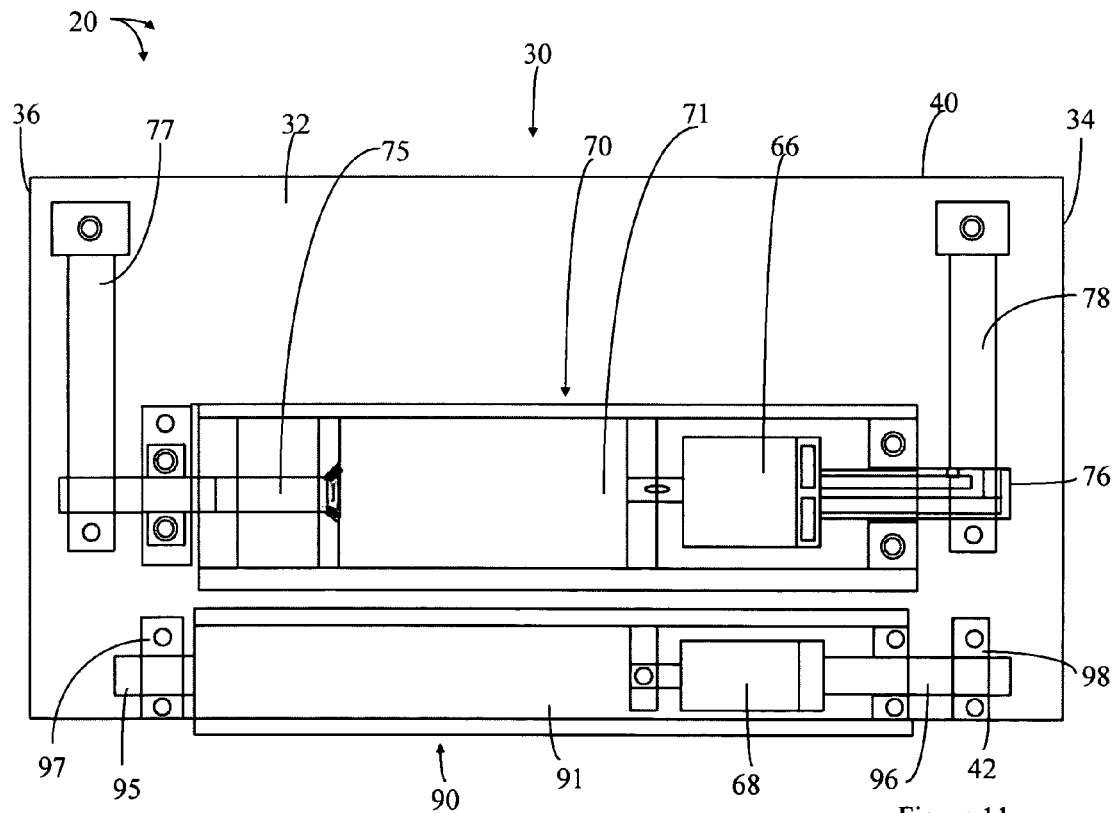
FIG. 11 is a front elevational view of another exemplary embodiment of the invention.
Figure 12:
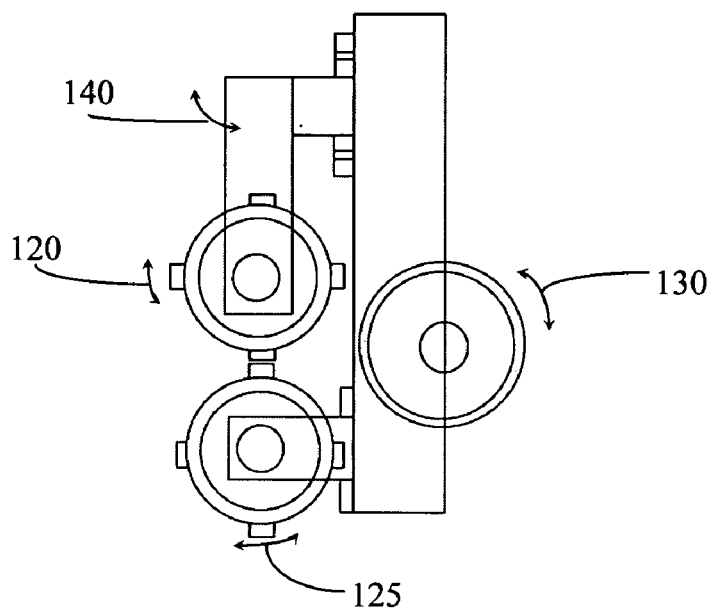
FIG. 12 is a partially fragmented side elevational view taken generally from the right of FIG. 11 but with portions omitted or shown in section for clarity.
Figure 13:
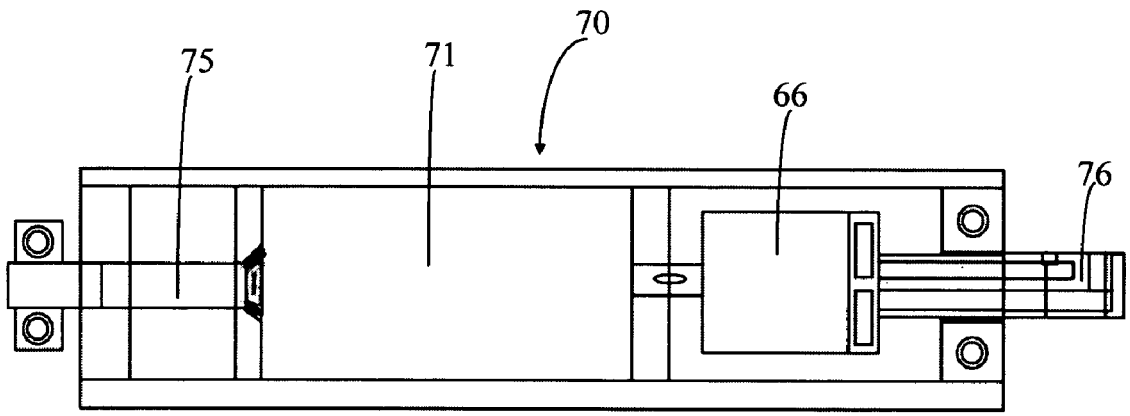
FIG. 13 is a partially fragmented, enlarged plan view of a roller with portions omitted or shown in section for clarity; and, FIG. 14 is a side elevational view thereof.
Figure 14:
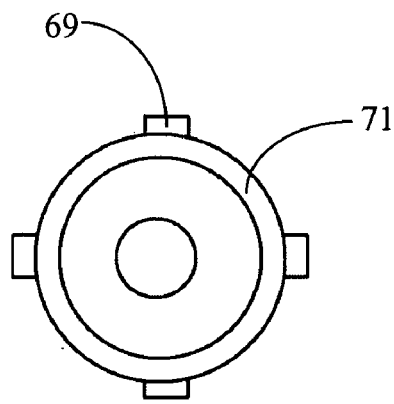

As shown in FIGS. 1 through 10 of the drawings, an exemplary embodiment of the brush cutter in accordance with the present invention is generally indicated by reference numeral 20. The present invention addresses the perceived shortcomings of the known art. The present invention provides a brush cutter and chipper 20 that attaches to the end of an articulated member 25 such as a hydraulic arm or boom, which are commonly found on conventional equipment 24 such as excavators, backhoes, trackhoes, or other similar equipment.

This equipment is mobile and well-suited for cross-country movement over ground 25. This is particularly useful for cutting materials such as tree limbs or brush or the like in remote utility right-of-ways 22 and other areas. These types of equipment also typically generate on-board hydraulic power through a hydraulic pump and such systems remotely operate and control hydraulic cylinders or motors for moving the arm or boom and related tools.

The attachment 20 is retrofittable to fit such machinery 24. The attachment 20 may be adapted to utilize the existing hydraulic power and controls already available on the machinery to enable its deployment. In this fashion, the attachment 20 is also economical to retrofit. Further, significant standardization of both the tool 20 and the machinery 24 is quite possible with such an arrangement as well.

The attachment tool 20 includes a rigid housing 30 that supports an external feed assembly 65 and an internal shredding assembly 100. The feed assembly 65 and shredding assembly 100 are preferentially driven by existing motive apparatus on the machine 24, such as the aforementioned hydraulic system utilizing hydraulic motors and associated controls. The housing 30 is substantially enclosed so that entering materials 26 that are to be shredded do not escape during chipping and the resultant exiting small debris 28 is not thrown from the housing in an uncontrolled fashion.

The housing includes a front wall 32 with a spaced apart rear wall 38. Two parallel and spaced apart side walls 34, 36 connect the front wall 32 to the rear 38 wall in a fixed manner. A housing top wall 40 is spaced apart from an open housing bottom wall 42 by the front, side and rear walls 32, 34, 36, 38 to form a rigid frame 44. Spaced apart coupling brackets 33 and 39 are secured to the front wall 32 and rear wall 38 adjacent top wall 40 to permit coupling of the housing 30 to the arm 25 in a conventional manner. In one exemplary embodiment, brackets 33 and 39 are penetrated by holes that receive coupling pins to secure the tool 20 to the arm 25 while permitting pivoting movement of tool 20.

The housing walls 32, 34, 36, 38, 40, 42 may be formed of solid plate or a mesh grid with small holes or a series of bars as desired. The primary consideration for walls 32, 34, 36, 38, 40, 42 is that they are made of any suitably rigid materials so that housing 30 forms a rigid structure. It is also possible to use a superstructure of rigid materials to define housing 30 with more flexible materials used for walls 32, 34, 36, 38, 40, 42. In actual usage, plate steel for walls 32, 34, 36, 38, 40, 42 has been found to be suitable. A steel plate thickness of 0.25 inches for the walls 32, 34, 36, 38, 40, 42 has been found suitable for many uses.

While a particular dimension for the frame 44 is not critical, a frame measuring approximately 2 feet front to rear 32, 38, 4 feet side to side 34, 36 and 3 feet top to bottom 40, 42, has been found to work successfully.

In addition to the use of a rigid superstructure for housing 30, the frame 44 may also be reinforced by thicker members or the like as desired (not generally shown). For example, in some circumstances it may be desirable to reinforce the frame 44 with an internal or external superstructure or skeleton to further brace the frame. The superstructure or skeleton may be formed from rigid members such as steel bars or pipes that may have a thickness greater than 0.25 inches, such as 0.5 inch plate or 1 inch pipe or the like.

The frame 44 defines a hollow cavity 46 in the housing 30. The cavity 46 provides a mounting area for the cutter 100 as well as support for the anchoring of a spring-biasing mechanism for the feed assembly 65. The housing top wall 40 may completely cover the cavity 46 with a solid plate or a mesh grid with small holes or elongated bars as desired but it has been found that gravity and the arrangement of the cutting drum 100 can retain substantially all of the materials entering the housing 30 until satisfactorily shredded even when the top wall 40 is completely open.

The front wall 32 is penetrated by a gate or mouth or portal or opening 50 that permits the entry of large materials 26 into the housing 30. The gate 50 in one exemplary embodiment defines an entryway having a roughly rectangular cross-section with a top 52 and parallel spaced apart sides 54, 56. This gate 50 measures approximately 12 inches tall by 36 inches wide.

It is contemplated that the gate 50 may utilize a one-way feed mechanism to ensure that materials 26 entering the housing 30 may not leave housing 30 through gate 50. One example of a one-way feed mechanism is a series of bars pivotally mounted to the gate top 52 and hanging down across the gate 50. These bars could pivot inwardly toward the cutter 100 to permit materials to enter the housing 30 but retard rearward movement.

The housing 30 uses an exit or portal or opening 60 to discharge shredded materials or smaller pieces 28 from the housing 30. The exit 60 in one exemplary embodiment defines a discharge pathway having a roughly rectangular cross-section that extends substantially across the entire dimension of wall 42. In another exemplary embodiment, the exit 60 is defined as being less than the entire dimension of wall 42. This exit 60 measures approximately 12 inches tall by 18 inches wide. In another exemplary embodiment, the exit 60 is defined in both the rear and bottom walls 38, 42.

It is contemplated that the exit 60 may use a peripheral chute that surrounds the exterior periphery of the exit 50 and extends from the frame 30 downwardly for a distance to further direct outgoing smaller pieces 28 more specifically toward a particular section of the ground 26 beneath the tool 20.

It is also contemplated that the exit 60 may use a one-way feed mechanism to ensure that materials may not enter housing 30 through exit 60. One example of a one-way feed mechanism is a series of bars pivotally mounted to the one side of the exit and extending across the exit 60. These bars could pivot outwardly from the cutter 100 to permit materials to exit the housing 30 while preventing inward movement.

The front wall 32 supports the feed assembly 65 including the driving motors 66 and 68 for an upper feed roller 70 and a lower feed roller 90. Motors 66, 68 may be hydraulic and advantageously linked as will be described hereinafter. Front wall 32 is penetrated by spaced apart slots 33, 35 that extend upwardly toward the top 40 from the gate top 52. The slots 33, 35 enable the upper feed roller 70 on assembly 65 to move in a vertical arc (as indicated by arrow 140) between the lower feed roller 90 and an upper feed plate 67.

The upper roller 70 includes a cylindrical drum 71 with an exterior periphery 72 extending between spaced apart ends 73, 74. The roller 70 may have several cleats or dogs 69 about its periphery 92 for more efficiently handling entering materials 26.

The drum 71 may be hollow or solid. In one exemplary embodiment, the hydraulic motor 66 for the roller 70 is mounted on the housing 30 proximate the roller 70. In this embodiment, the drum is solid and axle stubs 75, 76 extend outwardly from each end 73, 74. In another exemplary embodiment, the hydraulic motor 66 for the roller 70 is mounted inside the roller 70 to shield the motor from debris and the like. In this embodiment, drum 71 is at least partially hollow and defines a motor housing 79 that receives the hydraulic motor 66 that turns the roller 70. In all embodiments, axle stubs 75, 76 are seated in bearing housings on arms 77, 78.

The slots 35, 37 receive the arms 77, 78 that support the feed roller 70. Arms 77, 78 intersect feed plate 67 proximate exterior ends 80, 81. The ends 80, 81 are pivotally connected to plate 77 with pins or the like. Arms 77, 78 have internally housed ends 82, 83 that are coupled inside the housing 30 to the top wall 40 by springs 84, 85. Springs 84, 85 bias arms 77, 78 and upper roller 70 toward the lower roller 90.

The lower roller 90 includes a cylindrical drum 91 with an exterior periphery 92 extending between spaced apart ends 93, 94. The roller 90 may have several cleats or dogs 69 about its periphery 92 for more efficiently handling entering materials 26.

The drum 91 may be hollow or solid. In one exemplary embodiment, the hydraulic motor 68 for the roller 90 is mounted on the housing 30 proximate the roller 90. In this embodiment, the drum is solid and axle stubs 95, 96 extend outwardly from each end 93, 94. In another exemplary embodiment, the hydraulic motor 68 for the roller 90 is mounted inside the roller 90 to shield the motor from debris and the like. In this embodiment, drum 91 is at least partially hollow and defines a motor housing 99 that receives a hydraulic motor 68 that turns the roller 90. In all embodiments, axle stubs 95, 96 are seated in bearing housings on brackets 97, 98 that support the lower feed roller 90 on the housing 30 proximate the bottom of gate 50.

Thus, the pivotal movement of the upper roller 70 permits it to move in a vertical arc with respect to the lower roller 90. This pivoting movement permits variably sized limbs and brush to enter the housing 30 through the feed assembly 65 to feed the internal drum cutter 100. The spring biased upper roller 70 and stationary lower roller 90 are thus operatively secured to the housing 30 outside the gate 50.

The housing mounts an internal rotatable cutting assembly 100. Cutting assembly 100 includes an elongated cylindrical drum 102 with a periphery 104 extending between spaced apart ends 106, 108. The periphery 104 supports a cutter 110.

As mentioned previously, the drum 102 may be powered by hydraulic motor 103 or other means associated with the mobile machinery 24 upon which the attachment 20 is mounted. Primary consideration is that the drum 102 turns (as indicated by arrow 130) sufficiently to chip entering large materials 26, such as brush or tree limbs, with its cutter 110 into smaller pieces 28 for subsequent discharge therefrom.

The drum 102 may be peripherally wrapped by a cutter 110. Cutter 110 may include a chainsaw chain or other toothed chain 112. The cutting chain 112 is an elongated chain with spaced apart ends 114, 116. The chain 112 may be wrapped about the drum periphery 104 and secured at both ends 104, 106 with ends 114, 116. This enables the chain 112 to be easily removed and replaced or surfaced.

In one exemplary embodiment, the rollers 70, 90 and the cutter 110 are driven by the same hydraulic system so that they are rotationally linked to be driven simultaneously. Further, with appropriate control arrangements, the rollers 70, 90 and the cutter 110 can rotate to move materials forwardly into or rearwardly out of the gate 50 (as variously indicated by arrows 120, 125, 130).

Thus, the invention provides an apparatus 20 for a boom 22 on a mobile machine 24 where the mobile machine 24 provides controlled power to the apparatus 20. The apparatus 20 cuts large materials 26 including brush and limbs or the like into smaller pieces 28 to be deposited substantially directly beneath the apparatus 20. The apparatus 20 has a housing 30 with an exterior 31 and an interior 33 and with an entry gate 50 and an exit chute 60.

Adjacent the entry gate 50, an arcuately mobile spring biased upper feed roller 70 and a vertically spaced apart stationary lower feed roller 90 move entering materials 26 into the housing 30. The rollers 70, 90 rotate in opposite directions during use. Each of the feed rollers 70, 90 has spaced apart ends operatively secured by bearings and offset from the housing exterior 31 proximate the gate 50 by end mounted legs and brackets. Each roller 70, 90 has a plurality of peripherally protruding cleats or dogs 69 to engage the entering large materials. Each roller 70, 90 is driven by a hydraulic motor that selectively rotates the roller 70, 90 to feed large material 26 through the housing gate 50 to a rotary cutter 100. In one exemplary embodiment, each of the rollers 70, 90 has a hollow section for mounting its driving hydraulic motor inside the roller 70, 90.

During operation, the rollers 70, 90 rotate oppositely as indicated by arrows 120, 125 to thereby pull large materials 26 such as limbs and brush into the housing 30. Both of the rollers 70, 90 preferably have cleats or dogs on their periphery that catch on the entering material 26 to facilitate feeding by both opening the space between the rollers 70, 90 while also pulling the material into the housing mouth 50. The rollers 70, 90 are also powered by hydraulics or other means associated with the mobile machinery 24 upon which the attachment 20 is mounted.

The entering materials 26 are fed into the housing 30 by the rotating action of the feed rollers 70, 90, which forces the material 26 inside the housing 30 where it is to be cut-up and chipped or shredded.

The cutter 110 rotates against the bottom side of the fed material 26 to insure that the material is cut or chipped or shredded into smaller pieces 28. The material 26 entering the housing 30 may only leave through an exit 60 proximate the bottom of the housing 30. The exit 60 discharges the chipped material 28 onto the ground 29 beneath the housing 30. In this manner, the trajectory of flying debris is controlled such that the debris 28 is directed toward the ground vertically as opposed to horizontally spread. In this fashion, the debris 28 is directed away from the operator and the machinery to prevent detrimental encounters therewith.

Thus, the invention provides a brush cutter and chipper that attaches to the end of an articulating arm or boom on equipment. The cutter may utilize existing hydraulic power and controls. The cutter includes a housing with external feed rollers that feed material through a gate to an internal drum cutter. The upper roller is spring loaded and may move arcuately while the lower roller is stationary. The rollers preferably rotate oppositely and each has peripheral cleats to facilitate feeding. The housing mounts an internal rotating drum that may be rotationally linked with the rollers. The drum has a cutting surface, which may be a peripherally wound toothed chain, that cuts entering materials into smaller pieces. The drum rotates against the bottom side of the fed material to insure that the material is cut into small pieces. The small pieces exit through the bottom of the housing.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. An apparatus for a boom on a mobile machine where the mobile machine provides controlled power to the apparatus, said apparatus adapted to cut materials including brush and limbs or the like into smaller pieces to be deposited substantially directly beneath the apparatus, said apparatus comprising:

an articulating boom with a terminal end supported by the machine;

a housing coupled to said boom with an exterior and an interior and with an entry gate and an exit chute;

a feed assembly with an arcuately mobile spring biased upper feed roller and a vertically spaced apart stationary lower feed roller adapted to rotate in opposite directions, each of said feed rollers comprising spaced apart ends operatively secured to said housing exterior proximate said gate and each having a plurality of peripherally protruding cleats and each mounting a hydraulic motor adapted to selectively rotate said roller to feed material through said gate; and, a rotary drum having spaced apart ends bounding a periphery with a cutting chain wound around said periphery between said ends and coupled to said drum at said ends, said drum rotatably coupled to the interior of said housing proximate said gate with a hydraulic motor adapted to rotate said drum to cut materials entering said gate into small pieces that are discharged through said chute to be deposited substantially directly beneath said housing.

2. The apparatus as recited in claim 1 wherein each of said rollers comprise a hollow section mounting said hydraulic motor inside said roller.

* * * * *